United States Patent

Dominy

[15] 3,679,679

[45] July 25, 1972

[54] PREPARATION OF QUINOXALINE-DI-N-OXIDES FROM O-QUINONEDIOXIME AND BUTENE-1,4-DIONES

[72] Inventor: Beryl William Dominy, Groton, Conn.

[73] Assignee: Pfizer Inc., New York, N.Y.

[22] Filed: April 3, 1970

[21] Appl. No.: 25,544

[52] U.S. Cl. ...................................................260/250 R
[51] Int. Cl. ..........................................................C07d 51/78
[58] Field of Search ..............................................260/250 R

[56] References Cited

UNITED STATES PATENTS 3,398,141  8/1968  Haddadin et al...................260/250 R Primary Examiner—Nicholas S. Rizzo
Attorney—Connolly and Hutz

[57] ABSTRACT

Preparation of quinoxaline-di-N-oxides through a condensation of o-quinonedioxime and a butene-1,4-dione in a reaction-inert solvent at 20°–150° C.

8 Claims, No Drawings

PREPARATION OF QUINOXALINE-DI-N-OXIDES FROM O-QUINONEDIOXIME AND BUTENE-1,4-DIONES

BACKGROUND OF THE INVENTION

This invention relates to a novel synthetic procedure and, more particularly, to a process for the production of quinoxaline-di-N-oxides, useful as antibacterial agents.

Continuing efforts to discover new and more useful antibacterial agents have led, over the years, to the development of a variety of prototype organic compounds including numerous congeners of quinoxaline-di-N-oxides. Landquist, et al., J. Chem. Soc., 2052 (1956), in a search for compounds of improved antibacterial and antiprotozoal activity, reported the preparation of several derivatives of 2-methyl- and 2,3-dimethylquinoxaline-di-N-oxides using the procedure of Wegmann, et al., Helv. Chim. Acta., 29, 95 (1946) which comprised condensation of a 1,2-dione with o-phenylenediamine followed by peracid oxidation of the quinoxaline to the di-N-oxide. More recently Haddadin, et al., Tetrahedron Letters, 3253 (1965), demonstrated the synthesis of quinoxaline-di-N-oxides in a single step reaction utilizing a benzofuroxan and an enamine. This same group was also successful in condensing benzofuroxan with certain 1,3-diketones and β-ketoesters in the presence of a basic catalyst to yield quinoxaline-di-N-oxides, J. Org. Chem., 31, 4067 (1966). Ley, et al., Angew. Chem. internat. Edit., 8, 596 (1969), have corroborated the synthesis of quinoxaline-di-N-oxides from ketones and benzofuroxans and have shown that this latter reagent may be reacted in the presence of ammonia with phenol and quinone derivatives to provide phenazine-di-N-oxide analogs.

SUMMARY OF THE INVENTION

It has now been found that condensation of o-quinonedioxime with a butene-1,4-dione proceeds readily and permits the synthesis of quinoxaline-di-N-oxide derivatives, valuable for their antibacterial activity against pathogenic microorganisms.

The process of this invention comprises reacting o-quinonedioxime with a butene-1,4-dione of the formula

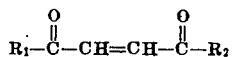

wherein $R_1$ and $R_2$ when considered separately are selected from the group consisting of hydrogen; alkyl and monosubstituted alkyl wherein both alkyl moieties contain from one to four carbon atoms and said substituent is selected from the group consisting of alkoxy and alkylthio containing one to two carbon atoms, cyano, chlorine, bromine, hydroxy and trifluoromethyl; cycloalkyl containing from three to eight carbon atoms; trifluoromethyl; phenyl; monosubstituted phenyl wherein said substituent is selected from the group consisting of methoxy, methyl, trifluoromethyl, methylsulfonyl, chloro, bromo, fluoro and dimethylamino and $R_1$ and $R_2$, when taken together, are selected from the group consisting of alkylene containing two to four carbon atoms, vinylene and 1,2-phenylene at a temperature from 20°–150° C.

Of particular interest in the process of the present invention are reactions between o-quinonedioxime, the unsubstituted reagent, and buten-1,4-dione where $R_1$ and $R_2$ are each alkyl containing from one to four carbon atoms; where $R_1$ is alkyl and $R_2$ is cycloalkyl containing three to eight carbon atoms; where $R_1$ and $R_2$ taken together is alkylene containing from two to four carbon atoms; where $R_1$ and $R_2$ taken together is vinylene; and where $R_1$ and $R_2$ taken together is 1,2-phenylene.

Surprisingly, the process of the instant invention is particularly unique in that no basic catalyst is necessary to bring about formation of the quinoxaline-di-N-oxide products, a characteristic not shared with other single step reactions leading to this class of compounds reported in the chemical literature.

DETAILED DESCRIPTION OF THE INVENTION

The herein described reaction is conveniently carried out between o-quinonedioxime and a butene-1,4-dione in a molar ratio of 1:1. It is, at times, advantageous to use a 10–20% excess of the butenedione and as much as a 100–200% excess can be employed. The order of addition is not critical; in practice, a solution of the quinonedioxime in a reaction-inert solvent is treated with the butenedione, either by itself of dissolved in the same or a different reaction-inert solvent. The solvent per so is not an integral part of the herein described invention but provides a single contact phase for the starting reagents. In some instances, the described reaction can be carried out neat, i.e., without a solvent.

By reaction-inert solvent is meant a solvent which, under the conditions of the process, does not enter into appreciable reaction with either the reactants or the products. Suitable solvents for the process of this invention include N,N-di-lower alkyl substituted derivatives of lower alkyl carboxamides, lower dialkylsulfoxides, cyclic ethers and lower alkanols. Also included within the purview of suitable solvents are lower alkyl acetates, e.g., ethyl acetate, lower alkyl ketone, such as acetone and lower alkyl substituted phosphoramides, e.g., hexamethylphosphoramide.

The reaction can be conducted over a wide temperature range. Temperatures of from 20°–150° C. are, however, preferred. The reaction time is not critical and depends on concentration, temperature and reactivity of the starting reagents.

The quinoxaline-di-N-oxide products of the present process are isolated by conventional methods known to those skilled in the art. For example, the reaction solvent can be removed under reduced pressure and the residual produce triturated or recrystallized from an appropriate solvent. Alternately, if the solvent employed for the herein described process is water miscible, the reaction mixture can be poured into or quenched with water and the resulting product isolated by suction filtration or extraction into a water immiscible solvent. In other instances in which the solubility of the formed product is exceeded in the particular solvent employed for the reaction process, the desired product crystallizes from the reaction mixture on cooling and is subsequently isolated by filtration.

Concerning the o-quinonedioximes starting reagent for the process of the present invention, it is found that, although the unsubstituted o-quinonedioxime is the preferred substrate for said reaction, substituted derivatives work equally well in yielding the desired products. Thus, o-quinonedioxime, or a substituted o-quinonedioxime can be employed in the process of the present invention. When a substituted o-quinonedioxime is employed, the favored position is the 4-position, while the nature of the substituent at said designated position can vary widely. In general, when a substituted o-quinonedioxime is employed as a starting reagent the preferred substituents include at least one of the following: methyl, methoxy, chloro, fluoro, bromo and trifluoromethyl.

The requisite o-quinonedioximes employed as the starting reagents in the process of the present invention are either readily available or easily prepared by one skilled in the art, e.g., from reduction of the corresponding benzofuroxans according to the method of Zincke, et al., Ann., 307, 28 (1899). The preparation of benzofuroxans, in turn, is well documented in the literature, e.g., as reviewed by Kaufman, et al., Chem. Rev., 59, 448 (1959), and more recently, in Advan. Heterocyclic Chem., 10, 1 (1969).

The butene-1,4-diones, the second starting reagent for the process of this invention, are either commercially available or can be prepared by one skilled in the art, for example, by decomposition of the corresponding diazoketone (Method I) as taught by Grundmann, Ann., 536, 29 (1938) and shown as follows:

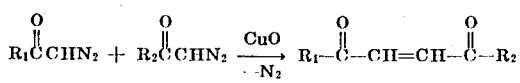

wherein $R_1$ and $R_2$ are as previously indicated. In instances where the diones

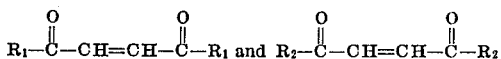

are formed to any appreciable extent they can be easily separated by fractional distillation.

The appropriate diazoketones are readily prepared from the acid chlorides $R_1COCl$ and $R_2COCl$ according to the methods outlined by Bachmann, et al., "Organic Reactions," Vol. I, John Wiley and Sons, New York, N. Y., 1942, Chap. 2.

An alternate method (Method II) for the synthesis of the butene-1,4-diones is the chromic acid oxidation ring cleavage of 2,5-disubstituted furans according to the method of Kawai, et al., Nippon Kagaku Zasshi, 80, 340 (1959); (C. A. 54, 24360a). The requisite furan derivatives are prepared by general methods known to those skilled in the art, for example, those outlined by Elderfield, et al., "Heterocyclic Compounds," Vol. I, John Wiley and Sons, New York, N. Y., 1950, Chap. 4 and by Stevens, "Chemistry of Carbon Compounds," Vol. IV[4], Elsevier Publishing Co., New York, N. Y., 1957, Chap. III.

A third method (Method III) for the synthesis of butene-1,4-diones of the formula

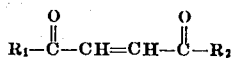

wherein $R_1$ and $R_2$ are phenyl or substituted phenyl comprises a reaction of fumaryl chloride with the benzene derivatives as outlined by Olah, "Friedel-Crafts and Related Reactions," Vol. III, part 1, Interscience Publishers, New York, N. Y., 1964, Chap. XXXI and XXXIV.

Also within the purview of this process invention are butene-1,4-diones of the aforementioned formula wherein $R_1$ and $R_2$ are lower alkoxy or di(lower alkyl)amino.

Quinoxaline-di-N-oxides result from the condensation of o-quinonedioxime with butene-1,4-diones, such that the 2- and 3- positions of the resulting anellated structure represent a carbonyl carbon and -CH= , of the dione. A single product is isolated when the $R_1$ and $R_2$ portions of the aforementioned dione are similar. However, when $R_1$ and $R_2$ are dissimilar, two products are formed. This multiple product formation results from the two orientation possibilities of the dione fragment in the final product because of the possible reaction of either carbonyl groups of the dione structure. For example, if one condenses o-quinonedioxime dioxime with a butene-1,4-dione of the formula

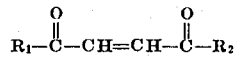

wherein $R_1$ and $R_2$ are dissimilar, two products result as shown by the formulas:

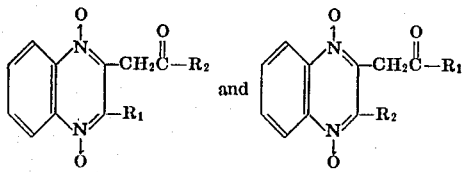

The mixture of products is recovered, as previously described, by methods known to those skilled in the art. In many of the herein disclosed preparations wherein a solid, often crystalline in nature, separates from the reaction mixture, the solid appears to consist predominantly of one of the products. Said product can be purified by repeated recrystallization from a suitable solvent to a constant melting point. The other product, the one present in smaller amounts in the originally isolated solid material, is the predominant product in the mother liquor. It can be removed therefrom by methods known in the art, as for example, the evaporation of the mother liquor and repeated recrystallization of the residue to a product of constant melting point. Alternately, the reaction mixture can be extracted either before or after evaporation to dryness.

Although said mixtures may be separated by methods known to those skilled in the art, for practical reasons it is advantageous to use said mixtures as they are isolated from the reaction mixture. Further, it is frequently useful to purify these mixtures of products by at least one recrystallization from an appropriate solvent or by trituration in an appropriate solvent. Said recrystallization or trituration thus allows the separation of the mixture of products from such extraneous materials as starting reagents and undesirable by-products.

The identification of the isomers has not been completed. Both products of a given reaction, however, exhibit the same type of activity, e.g., as antibacterial agents.

As previously indicated, the quinoxaline-di-N-oxides of the present invention re readily adapted to therapeutic use as antibacterial agents. are Typical member compounds of interest as in vitro and in vivo antibacterial agents include 2-methyl-3-acetonylquinonaxaline-di-N-oxide, 2-phenazinol-5,10-dioxide and 5-benzo[a]phenazinol-7,12-dioxide.

The valuable products of this invention are remarkably effective in treating a wide variety of pathogenic micro-organisms. They are, therefore, useful as industrial antimicrobials, for example, in water treatment, slime-control, paint preservation and wood preservation as well as for topical application purposes as disinfectants.

For in vitro use, e.g., for topical application, it will often be convenient to compound the selected product with a pharmaceutically-acceptable carrier such as vegetable or mineral oil or an emollient cream. Similarly, they may be dissolved or dispensed in liquid carriers or solvents such as water, alcohol, glycols or mixtures thereof or other pharmaceutically acceptable inert media, that is, media which have no harmful effect on the active ingredient. For such purposes, it will generally be acceptable to employ concentrations of active ingredients of from about 0.01 percent to about 10 percent by weight based on total composition.

In determining the in vitro activity of the herein described antibiotic, the sensitivity of the various micro-organisms is determined by the commonly accepted two fold serial dilution technic. Final concentrations of compound per ml. range from 100 mcg. in the first tube to 0.19 mcg. in the tenth tube. The inoculum consists of 0.5 ml. of a $1 \times 10^{-3}$ dilution of a standardized culture. Final volume in each tube or cup in the DisPoso tray is 1.0 ml. The tubes are incubated at 37° C. for approximately 24 hours. The medium used is Witkins synthetic or Brain Heart Infusion (BHI). The sensitivity (MIC - minimal inhibitory concentration) of the test organism is accepted as evidenced by the absence of gross turbidity.

Further, compounds described herein exhibit broad spectrum activity, that is, activity against both gram-negative and gram-positive bacteria, in contrast to the usual gram-negative activity of quinoxaline-di-N-oxides. Additionally, they are active in vivo.

When used in vivo for such purposes, these novel compounds can be administered orally or parenterally, e.g., by subcutaneous, intramuscular, or intravenous injection, at a dosage of from about 1 mg./kg. to about 100 mg./kg. of body weight. Vehicles suitable for parenteral injection may be either aqueous such as water, isotonic saline, isotonic dextrose, Ringer's solution, or non-aqueous such as fatty oils of vegetable origin (cotton seed, peanut oil, corn, sesame), dimethylsulfoxide and other non-aqueous vehicles which will not interfere with therapeutic efficiency of the preparation and are nontoxic in the volume or proportion used (glycerol, propylene glycol, sorbitol and dimethylacetamide). Additionally, compositions suitable for extemporaneous preparation of solutions prior to administration may advantageously be made. Such compositions may include liquid diluents, for example, propylene glycol, diethyl carbonate, glycerol, sorbitol, etc.; buffering agents, hyaluronidase, local anesthetics and inorganic salts to afford desirable pharmacological properties. These compounds may also be combined with various pharmaceutically-acceptable inert carriers including solid diluents, aqueous vehicles, nontoxic organic solvents in the form of capsules, tablets, lozenges, troches, dry mixes, suspensions, solutions, elixirs and parenteral solutions or suspensions. In general, the compounds are used in various dosage forms at concentration levels ranging from about 0.5 percent to about 90 percent by weight of the total composition.

The in vivo efficacy of the compounds of the instant invention is determined by the antibacterial activity against acute infections in mice. The acute experimental infections are produced by the intraperitoneal inoculation of standardized culture suspended in either 5% hog gastric mucin or broth. A brief discussion of the words "standardized culture" would seem to be beneficial. In order to obtain reproducible results with a test compound it is necessary to control, as much as possible, the many variables that can enter into this type of test. An organism of high virulence if used in large enough numbers can make almost any drug look inactive. On the other hand, an inoculum not able to produce a measurable difference between treated and untreated groups is equally lacking in purpose.

Stock cultures of test organisms are normally maintained on slants or in liquid medium. When not routinely used they are maintained at refrigerator temperature or in a lyophilized state. When it becomes necessary to use a culture in animal protection tests the culture is suspended in a volume of saline or broth, and the density of the suspension is measured by a photoelectric colorimeter. From this stock, ten-fold dilutions are prepared. Each dilution is inoculated into a series of mice in order to determine the $LD_{100}$, the $LD_{100}$ being the lowest concentration of organisms required to produce 100 percent deaths. For example, if it is found that a dilution of $10^{-4}$ is the lowest level of organism that will produce 100 percent death, an inoculum of $10^{-3}$ would probably be used for the drug evaluation experiments. This means that we are using about 10 $LD_{100}$ or ten times the minimum dose required to kill mice. Such a test would also include the use of control animals which receive an inoculum of $10^{-4}$, $10^{-5}$, and possible $10^{-6}$. These dilutions are included as a check on possible variation in virulence which can occur. Having previously determined, through the virulence titration, that $10^{-4}$ was the maximum dilution that will kill we naturally except these animals to die, usually within 24 hours.

Each organism has its own standardized inoculum level. Some, such as Staphylococcus, may be used at $10^{-1}$, while others like Streptococcus require weekly animal passage in order to maintain virulence.

When evaluating an antibiotic for its effectiveness after a single dose, the dose is usually administered 0.5 hour after inoculating the mice with the lethal concentration of organisms. In this type of treatment schedule surviving mice are usually held for four days after the treatment and the percent alive is calculated.

The following examples are provided solely for the purpose of illustration and are not to be construed as limitations of this invention, many variations of which are possible without departing from the spirit or scope thereof.

EXAMPLE I

2-Methyl-3-acetonylquinoxaline-1,4-dioxide

A solution of 1.0 g. (7.5 m moles) of quinonedioxime and 1.0 g. (8.9 m moles) of 3-hexene-2,5-dione in 10 ml. of tetrahydrofuran is heated to reflux for 24 hours. The reaction mixture is cooled, the solvent removed under reduced pressure and the residue triturated with ethanol. The solids are filtered, washed with water and dried, 200 mg., m.p. 184°–186° C. Recrystallization raised the melting point to 193° C. (MIC against Strep. pyogenes is 100 mcg./ml.).

EXAMPLE II

The procedure of example I is repeated, using the appropriate starting reagents, to provide the following compounds:

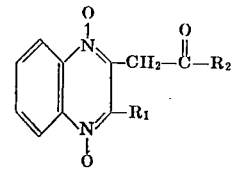

| $R_1$ | $R_2$ | $R_1$ | $R_2$ |
|---|---|---|---|
| $CH_3-$ | $C_2H_5-$ | $H-$ | $t-C_4H_9-$ |
| $C_2H_5$ | $CH_3-$ | $t-C_4H_9-$ | $H-$ |
| $CH_3-$ | $n-C_4H_9-$ | $H-$ | $H-$ |
| $n-C_4H_9-$ | $CH_3-$ | $CH_3-$ | $CH_3O(CH_2)_2-$ |
| $i-C_3H_7-$ | $i-C_3H_7-$ | $CH_3O(CH_2)_2-$ | $CH_3-$ |
| $CH_3-$ | $H-$ | $C_2H_5OCH_2-$ | $C_2H_5OCH_2-$ |
| $H-$ | $CH_3-$ | $C_2H_5S(CH_2)_2-$ | $C_2H_5S(CH_2)_2-$ |
| $C_2H_5SCH_2-$ | $CH_3-$ | $CF_3CH_2-$ | $C_2H_5-$ |
| $CH_3-$ | $C_2H_5SCH_2-$ | $CF_3(CH_2)_2$ | $n-C_4H_9-$ |
| $CN(CH_2)_2-$ | $CH_3-$ | $CF_3CH_2-$ | $HO(CH_2)_2-$ |
| $CH_3-$ | $CN(CH_2)_2-$ | $Cl(CH_2)_3-$ | $CH_3-$ |
| $CNCH_2-$ | $CNCH_2-$ | $HOCH(CH_3)CH_2-$ | $CH_3-$ |
| $Cl(CH_2)_2-$ | $Cl(CH_2)_2-$ | $HO(CH_2)_2-$ | $HO(CH_2)_2-$ |
| $Br(CH_2)_2-$ | $Br(CH_2)_2-$ | $Br(CH_2)_4-$ | $CH_3-$ |
| $CH_3-$ | $Br(CH_2)_4$ | | |

EXAMPLE III

The procedure of Example I is again repeated, starting with the requisite butene-1,4-dione and o-quinonedioxime, to provide the following analogs:

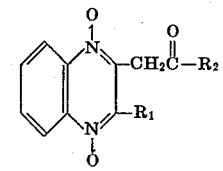

| $R_1$ | $R_2$ | $R_1$ | $R_2$ |
|---|---|---|---|
| $CH_3-$ | cyclo $C_3H_5-$ | $Cl(CH_2)_9-$ | cyclo $C_6H_{11}-$ |
| cyclo $C_3H_5-$ | $CH_3-$ | cyclo $C_6H_{11}-$ | $Cl(CH_2)_4$ |
| $i-C_3H_7-$ | cyclo $C_6H_{11}-$ | $BrCH_2-$ | cyclo $C_3H_5-$ |
| cyclo $C_6H_{11}-$ | $i-C_3H_7-$ | cyclo $C_3H_5-$ | $BrCH_2-$ |
| $CF_3CH_2-$ | cyclo $C_7H_{13}-$ | $CNCH_2-$ | cyclo $C_6H_{11}-$ |
| cyclo $C_7H_{13}-$ | $CF_3CH_2-$ | cyclo $C_6H_{11}-$ | $CNCH_2-$ |
| $CF_3CH(CH_3)CH_2-$ | cyclo $C_8H_{15}-$ | $CN(CH_2)_3-$ | cyclo $C_4H_7-$ |
| cyclo $C_8H_{15}-$ | $CF_3CH(CH_3)CH_2-$ | cyclo $C_4H_7-$ | $CN(CH_2)_3-$ |
| cyclo $C_6H_{11}-$ | cyclo $C_8H_{11}-$ | $CH_3SCH_2-$ | cyclo $C_6H_{11}-$ |
| cyclo $C_3H_5-$ | cyclo $C_8H_{15}-$ | cyclo $C_6H_{11}-$ | $CH_3SCH_2-$ |
| cyclo $C_8H_{15}-$ | cyclo $C_3H_5-$ | $C_2H_5O(CH_2)_3-$ | cyclo $C_3H_5-$ |
| $HO(CH_2)_2-$ | cyclo $C_3H_5-$ | cyclo $C_3H_5-$ | $C_2H_5O(CH_2)_3-$ |
| cyclo $C_5H_9-$ | $HO(CH_2)_2-$ | | |
| $HO(CH_2)_4-$ | cyclo $C_3H_5-$ | | |
| cyclo $C_3H_5-$ | $HO(CH_2)_4-$ | | |

EXAMPLE IV

2-Phenazinol-5,10-dioxide

To 900 mg. (6.5 m moles) of o-quinonedioxime contained in 10 ml. of tetrahydrofuran is added 700 mg. (6.5 m moles) of p-quinone, and the resulting reaction mixture stirred at room temperature overnight. The resulting precipitate is suction filtered and dried, 500 mg., m.p. 210° C., dec. Recrystallization from acetic acid-trifluoroacetic acid raised the melting point, 232° C., dec. (MIC against Staph. aureus is 50 mcg./ml.).

EXAMPLE V

Employing the procedure of Example I and utilizing the appropriate cyclic diketones and O-quinonedioxime, the following congeners are prepared:

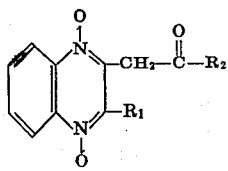

| $R_1$ | $R_2$ |
|---|---|
| $-(CH_2)_2-$ | |
| $-(CH_2)_3-$ | |
| $-(CH_2)_4-$ | |
| $-CH_2CH(CH_3)CH_2-$ | |
| $-CH(CH_3)CH(CH_3)-$ | |

EXAMPLE VI

The procedure of Example IV is repeated wherein equivalent amounts of the requisite diketones listed below are used in place of p-quinone to provide the products illustrated to good yields:

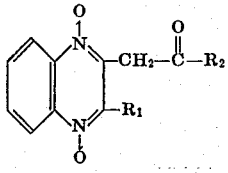

Diketone
$R_1COCH \quad CHCOR_2$

| $R_1$ | $R_2$ | Product |
|---|---|---|
| $C_6H_5-$ | $C_6H_5-$ | 2-Phenyl-3-phenacylquinoxaline-1,4-dioxide |
| $4-ClC_6H_4-$ | $C_6H_5-$ | 2-(4-Chlorophenyl)-3-phenacylquinoxaline-1,4-dioxide and 2-Phenyl-3-(4-chlorophenacyl)quinoxaline-1,4-dioxide |
| $3-CH_3C_6H_4-$ | $2-CH_3OC_6H_4-$ | 2-(3-Tolyl)-3-(2-methoxyphenacyl)-quinoxaline-1,4-dioxide and 2-(2-Anisyl)-3-(3-methylphenacyl)-quinoxaline-1,4-dioxide |
| $4-(CH_3)_2NC_6H_4-$ | $4-CF_3C_6H_4-$ | 2-(4-Dimethylaminophenyl)-3-(4-trifluoromethylphenacyl) quinoxaline-1,4-dioxide and 2-(Trifluoromethylphenyl)-3-(4-dimethylaminophenacyl)quinoxaline-1,4-dioxide |
| $3-BrC_6H_4-$ | $4-CH_3SO_2C_6H_4-$ | 2-(3-Bromophenyl)-3-(4-methylsulfonylphenacyl)quinoxaline-1,4-dioxide and 2-(4-methylsulfonylphenyl)-3-(3-bromophenacyl)quinoxaline-1,4-dioxide |
| $4-(CH_3)_2NC_6H_4-$ | $4-(CH_3)_2NC_6H_4-$ | 2-(4-Dimethylaminophenyl)-3-(4-dimethylaminophenacyl)quinoxaline-1,4-dioxide |

EXAMPLE VII

The procedure of Example IV is again repeated wherein the following diketones are employed, to provide the corresponding products in good yields:

| Diketone | Product |
|---|---|
| 1-Phenyl-2-pentene-1,4-dione | 2-Phenyl-3-acetonylquinoxaline-1,4-dioxide and 2-methyl-3-phenacylquinoxaline-1,4-dioxide |
| 1-(4-Anisyl)-4-cyclohexyl-2 butene-1,4-dione | 2-(4-Anisyl)-3-cyclohexylcarbonylmethylquinoxaline-1,4-dioxide and 2-cyclohexyl-3-(4-methoxyphenacyl)-quinoxaline-1,4-dioxide |
| 1-(4-Dimethylaminophenyl)-6 hydroxy-2-hexene-1,4-dione | 2-(4-Dimethylaminophenyl)-3-(2-hydroxyethylcarbonylmethyl)quinoxaline-1,4-dioxide and 2-(2-hydroxyethyl)-3-(4-dimethylaminophenacyl)quinoxaline-1,4-dioxide |
| 1-Phenyl-5-cyano-2-pentene-1,4-dione | 2-Phenyl-3-cycanoacetonylquinoxaline-1,4-dioxide and 2-cyanomethyl-3-phenylquinoxaline-1,4-dioxide |
| 1-(4-Chlorophenyl)-6-trifluoromethyl-2-heptene-2,4-dione | 2-(4-Chlorophenyl)-3-[2-(trifluoromethyl)propylcarbonylmethyl]quinoxaline-1,4-dioxide and 2-[2-(trifluoromethyl)-propylcarbonylmethyl]-3-(4-chlorophenacyl)quinoxaline-1,4-dioxide |
| 1-(4-Methoxyphenyl)-4-cyclopropyl-2-butene-1,4-dione | 2-(4-Methoxyphenyl)-3-cyclopropylcarbonylmethylquinoxaline-1,4-dioxide and 2-cyclopropyl-3-(4-methoxyphenacyl)quinoxaline-1,4-dioxide |

EXAMPLE VIII

5-Benzo[a]phenazinol-7,12-dioxide

To a solution of 1.0 g. (6.3 m moles) of 1,4-naphthoquinone in 20 ml. of tetrahydrofuran is added 880 mg. (6.3 m moles) of o-quinonedioxime and the resulting solution allowed to stir at room temperature for 10 days. The red precipitate is filtered and dried, 1.2 g., m.p. 233°–235° C., dec. The analytical sample is recrystallized from acetic acid-trifluoracetic acid, m.p. 242° C., dec. (MIC against Staph. aureus is 50 mcg./ml.).

EXAMPLE IX

Starting with o-quinonedioxime and the requisite diketone, and following the procedure of Example I, the following analogs are prepared:

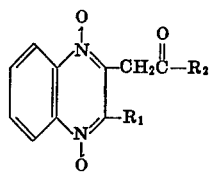

| R₁ | R₂ | R₁ | R₂ |
|---|---|---|---|
| CF₃— | CH₃— | H— | CF₃— |
| CH₃— | CF₃— | CF₃— | H— |
| CF₃— | n—C₄H₉— | CF₃— | cyclo C₃H₅— |
| n—C₄C₉— | CF₃— | cyclo C₃H₅— | CF₃— |
| CF₃— | HO(CH₂)₂— | CF₃— | CF₃CH₂— |
| HO(CH₂)₂— | CF₃— | CF₃CH₂— | CF₃— |
| CF₃— | Cl(CH₂)₂— | CF₃— | 4—(CH₃)₂NC₆H₄— |
| Cl(CH₂)₂— | CF₃— | 4—(CH₃)₂NC₆H₄— | CH₃— |
| CF₃— | cyclo C₆H₁₁— | | |
| cyclo C₆H₁₁— | CF₃— | | |

Preparation A

2-Butene-1,4-diones

Method I.

The following butene-1,4-dione derivatives not previously reported in the literature are synthesized according to the method of Grundmann, *Ann.*, 536, 29 (1938), which comprises heating α-diazoketones with a catalyst, such as CuO in an appropriate solvent, e.g., benzene, toluene or benzine, followed by isolation of the desired product by fractional distillation or recrystallization.

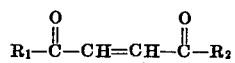

| R₁ | R₂ | R₁ | R₂ |
|---|---|---|---|
| CH₃O(CH₂)₂— | CH₃— | CF₃CH₂— | C₂H₅— |
| C₂H₅OCH₂— | C₂H₅O(CH₂)₂— | CF₃(CH₂)₂— | n—C₄H₉— |
| C₂H₅SCH₂— | C₂H₅SCH₂— | CF₃CH₂— | HO(CH₂)₂— |
| C₂H₅SCH₂— | CH₃— | CH₃— | cyclo C₃H₅— |
| CH(CH₃)₂— | CH₃— | i—C₃H₇— | cyclo C₆H₁₁— |
| CNCH₂— | CNCH₂— | CF₃CH₂— | cyclo C₇H₁₃— |
| Cl(CH₂)₂— | Cl(CH₂)₂— | CF₃CH(CH₃)CH₂— | cyclo C₈H₁₅— |
| Cl(CH₂)₃— | CH₃— | HO(CH₂)₂— | cyclo C₅H₉— |
| HOCH(CH₃)CH₂— | CH₃— | HO(CH₂)₄— | cyclo C₃H₅— |
| HO(CH₂)₂— | HO(CH₂)₂— | Cl(CH₂)₄— | cyclo C₆H₁₁— |
| Br(CH₂)₂— | Br(CH₂)₂— | BrCH₂— | cyclo C₃H₅— |
| Br(CH₂)₄— | CH₃— | CNCH₂— | cyclo C₆H₁₁— |
| CH₃SCH₂— | cyclo C₆H₁₁— | CN(CH₂)₃— | cyclo C₄H₇— |
| C₂H₅O(CH₂)₃— | cyclo C₃H₅ | —(CH₂)₄— | Cl(CH₂)₂— |
| —CH₂CH(CH₃)CH₂— | | CF₃— | cyclo C₆H₁₁— |
| —CH(CH₃)CH(CH₃)— | | CF₃— | CF₃CH₂—H₄— |
| 4—CH₃OC₆ | cyclo C₆H₁₁— | CF₃— | 4—(CH₃)₂NC₆H₄— |
| HO(CH₂)₂— | 4—(CH₃)₂NC₆H₄— | CF₃— | |
| C₆H₅— | CNCH₂— | | |
| 4—ClC₆H₄— | CH₃CH(CF₃)CH₂— | | |
| 4—CH₃OC₆H₄— | cyclo C₃H₅— | | |
| CF₃— | cyclo C₃H₅— | | |
| CF₃— | HO(CH₂)₂— | | |

Method II.

The following butene-1,4-diones not reported in the chemical literature are prepared by the method as taught by Kawai, *et al., Nippon Kagaku Zasshi*, 80, 340 (1959) (C. A. 54, 24359i (1960)), which comprises oxidative ring cleavage of 2,5-disubstituted furans employing a chromic acid solution at ice-bath temperatures in acetic acid solvent.

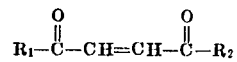

| R₁ | R₂ |
|---|---|
| CF₃— | CH₃— |
| CF₃— | n—C₄H₉— |

| R₁ | R₂ |
|---|---|
| CH₃— | C₂H₅— |
| i—C₃H₇— | i—C₃H₇— |
| cyclo C₆H₁₁— | cyclo C₆H₁₁— |
| cyclo C₃H₅— | cyclo C₈H₁₅— |
| C₆H₅— | CH₃— |

Method III.

The following butene-1,4-diones not previously reported in the literature are synthesized according to the methods as outlined by Olah, "Friedel–Crafts and Related Reactions," Vol. iii, part 1, Interscience Publishers, New York, N.Y., 1964, Chap. XXXI and XXXIV, and comprises reacting a benzene derivative with fumaryl chloride in the presence of a suitable catalyst, e.g., aluminum chloride, in an appropriate inert solvent.

$$R_1-\overset{O}{\underset{\|}{C}}-CH=CH-\overset{O}{\underset{\|}{C}}-R_2$$

| R₁ | R₂ |
|---|---|
| C₆H₅— | 4—ClC₆H₄— |
| 3—CH₃C₆H₄— | 2—CH₃OC₆H₄— |
| 4—(C n₃)NC₆H₄— | 4—CF₃C₆H₄— |
| 3—BrC₆H₄— | 4—CH₃SO₂C₆H₄— |
| 4—(CH₃)₂NC₆H₄— | 4—(CH₃)₂NC₆H₄— |

What is claimed is:

1. A process for the preparation of quinoxaline-di-N-oxides which comprises reacting o-quinonedioxime with a butene-1,4-dione of the formula $$R_1-\overset{O}{\underset{\|}{C}}-CH=CH-\overset{O}{\underset{\|}{C}}-R_2$$

wherein R₁ and R₂, when considered separately, are selected from group consisting of hydrogen; alkyl and mono-substituted alkyl wherein both alkyl moieties contain from one to four carbon atoms and said substituent is selected from the group consisting of alkoxy and alkylthio containing one to two carbon atoms, cyano, chlorine, bromine, hydroxy and trifluoromethyl; cycloalkyl containing from three to eight carbon atoms; trifluoromethyl; phenyl; mono-substituted phenyl wherein said substituent is selected from the group consisting of methoxy, methyl, trifluoromethyl, methylsulfonyl, chloro, bromo, fluoro and dimethylamino and R₁ and R₂, when taken together, are selected from the group consisting of alkylene containing two to four carbon atoms, vinylene and 1,2-phenylene at a temperature from 20°–150°C.

2. The process of claim 1 wherein said reaction is carried out in a reaction-inert solvent.

3. The process of claim 2 wherein R₁ and R₂ are each methyl and the reaction-inert solvent is tetrahydrofuran.

4. The process of claim 1 wherein R₁ and R₂ are each said alkyl or said mono-substituted alkyl.

5. The process of claim 1 wherein R₁ is said alkyl or said mono-substituted alkyl and R₂ is cycloalkyl containing from three to eight carbon atoms.

6. The process of claim 1 wherein R₁ and R₂ are together alkylene containing two to four carbon atoms.

7. The process of claim 1 wherein R₁ and R₂ are together vinylene.

8. The process of claim 1 wherein R₁ and R₂ are together 1,2-phenylene.

* * * * *